United States Patent Office 3,351,664
Patented Nov. 7, 1967

3,351,664
2-AMINO-ALKANETHIOLS
Clarence R. Bresson, Bartlesville, Okla., assignor to Phillips Petroleum Company, a corporation of Delaware
No Drawing. Filed Sept. 28, 1964, Ser. No. 399,933
9 Claims. (Cl. 260—584)

This invention relates to compounds containing both amino and mercapto groups. In one aspect, this invention relates to novel 2-amino-2-mercaptomethyl-1,3-propanediols and their salts. In another aspect this invention relates to a method for preparing these novel compounds. In still another aspect this invention relates to a method for controlling the effects of radiation upon animal life.

I have now discovered an entirely new class of compounds containing both amino groups and mercaptan groups which are very useful in controlling the effects of radiation upon animal life.

It is, accordingly, an object of my invention to provide a new class of compounds containing both amino groups and mercapto groups. Another object is to provide novel substituted 2-amino-alkanethiol compounds and salts thereof. Yet another object is to provide 2-amino-2-mercaptomethyl-1,3-propanediol and salts thereof. A further object is to provide a method for making these novel compounds. A still further object is to provide a method for controlling the effects of radiation upon animal life.

Other objects and many of the attendant advantages of this invention will be readily appreciated as the same becomes better understood by reference to the following detailed description and examples.

According to the process of my invention, I provide new compounds represented by the following formula:

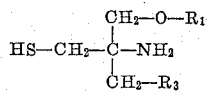

wherein each $R_1$ is selected from the group consisting of hydrogen and alkyl radicals containing from 1–12 carbon atoms, wherein each $R_3$ is selected from the group consisting of hydroxyl radicals, alkoxy radicals having 1–12 carbon atoms, hydrogen, and alkyl, aryl, and aralkyl radicals having 1–12 carbon atoms.

These novel compounds of my invention are prepared by contacting for a few minutes at a temperature generally ranging from 0–100° C. an oxazoline with a thiol acid, yielding with good results thiol esters. The reaction can be represented by the following equation:

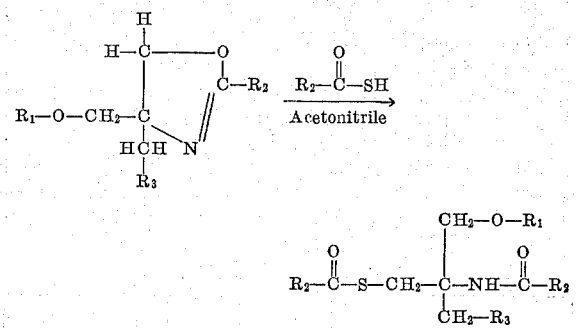

wherein $R_1$ and $R_3$ are as defined hereinabove and each $R_2$ is selected from the group consisting of alkyl, aryl, aralkyl, and alkaryl radicals having from 1–12 carbon atoms.

The mol ratio of thiol acid to oxazoline should be at least 1:1, but generally should not exceed 1.5:1. The thiol acids are represented by a formula:

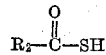

wherein $R_2$ is as defined hereinabove.

Examples of thiol acids which have been employed in this reaction include thiolacetic acid, thiolpropionic acid, thiolvaleric acid, thiolbenzoic acid, thiolphenylacetic acid, and the like.

This reaction is preferably carried out in the presence of a diluent; however, the choice of diluents is fairly narrow, as it has been found that pyridine and alkylnitrile were suitable while the reaction did not occur in tetrahydrofuran. Acetonitrile has been found to be vastly superior to pyridine as a purer product crystallized out from the reaction mixture, thereby vastly simplifying the recovery and purification of the reaction product. Other diluents besides pyridine and acetonitrile which can be used include: propionitrile, butyronitrile, and higher alkyl nitriles; pyrazine, pyrimidine, pyridazine, quinoline, 2-methyl-5-ethyl pyridine, and other alkyl-substituted pyridines.

These thiol esters are then hydrolyzed with a suitable inorganic acid to yield the novel compounds of Formula I. As described herein, hydrolysis of the thiol ester is intended to cover hydrolysis of both the thiol ester group and the amide group present in the compounds shown as products in the equation on page 2. The selection of the acid is limited to an inorganic acid which will neither esterify or otherwise react with the hydrolysis product. Hydrolysis with an organic acid would result in reformation of the oxazoline. Suitable acids for the hydrolysis reaction include hydrochloric acid, sulphuric acid, and phosphoric acid. The compounds obtained on hydrolysis are the acid salts of the compounds of Formula I. Such salts can be converted to the free base by neutralization with a base, e.g., alkali metal hydroxides such as NaOH.

Examples of the novel compounds represented by the general Formula I described hereinabove and produced according to the process of this invention include:

2-amino-2-mercaptomethyl-1,3-propanediol
2-(methoxymethyl)-3-methoxy-2-aminopropanethiol
2-(ethoxymethyl)-3-ethoxy-2-aminopropanethiol
2-(n-butoxymethyl)-3-n-butoxy-2-aminopropanethiol
2-hydroxymethyl-2-aminohexanethiol
2-methoxymethyl-2-aminoundecanethiol
2-ethoxymethyl-2-aminopentadecanethiol
5,5-dimethyl-2-hydroxymethyl-2-aminoheptanethiol
2-amino-2-hydroxymethyl propanethiol
2-amino-2-hydroxymethyl butanethiol
2-amino-2-hydroxymethyl nonanethiol Oxazolines which have been found to be suitable for producing the novel compounds of my invention include:

2-methyl-4,4-bis(hydroxymethyl)oxazoline
2-ethyl-4-methoxymethyloxazoline
2-isobutyl-4,4-bis(ethoxymethyl)oxazoline
2-n-hexyl-4,4-bis(isopropoxymethyl)oxazoline
2-n-octyl-4,4-bis(hydroxymethyl)oxazoline
2-(2-phenylethyl)4,4-bis(ethoxymethyl)oxazoline
2-n-octyl-4-n-decyl-4-hydroxymethyloxazoline
2-benzyl-4-n-dodecyl-4-ethoxymethyloxazoline
2-p-tolyl-4-tridecyl-4-butoxymethyloxazoline These oxazolines are prepared by refluxing a mixture consisting of a compound represented by the general formula:

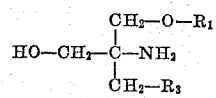

wherein $R_1$ and $R_3$ include those groups as previously defined hereinabove with an organic acid represented by the following general formula:

$$R_2-\overset{O}{\underset{\|}{C}}-OH$$

wherein $R_2$ includes those groups as previously defined hereinabove.

Examples of those organic acids which have been found to be suitable are:

acetic acid
propionic acid
butyric acid
caproic acid
caprylic acid
pelargonic acid
benzoic acid
phenylacetic acid
phenylpropionic acid
p-ethylbenzoic acid
lauric acid
7-phenylheptanoic acid
p-n-hexylbenzoic acid
tridecanoic acid, and the like.

This refluxing operation may be carried out in a Dean and Stark apparatus whilst remiving the released water. Since this reaction is accompanied by the splitting out of water, it is carried out at a temperature ranging from 100° C. to about 200° C., although even higher temperature can be employed if they are desired. This refluxing operation can be carried out in the presence or absence of additional diluent, although it should be pointed out that the reacting organic acid can also function as the reaction diluent. However, suitable additional diluents which can be used in this refluxing operation would be those which are inert with respect to the reactants and which boil above 100° C. Diluents which are suitable for this purpose include, for example, toluene, xylene, propionitrile, n-pentanol, and the like.

The following compounds correspond to the general Formula II and were found suitable to form the oxazolines which were useful in the preparation of our novel compounds. These compounds include:

2-amino-2-hydroxymethyl-1,3-propanediol
3-methoxy-2-(hydroxymethyl)-2-aminopropanol
3-methoxy-2-(methoxymethyl)-2-aminopropanol
3-ethoxy-2-(methoxymethyl)-2-aminopropanol
2-amino-2-methyl-1,3-propanediol
2-(methoxymethyl)-2-aminohexanol
2-(ethoxymethyl)-2-aminopentadecanol
2-amino-2-heptyl-1,3-propanediol, and the like.

The following examples will serve to illustrate more fully the manner in which I practice my invention:

*Example I*

A run was carried out in which 2-amino-2-mercaptomethyl-1,3-propanediol hydrochloride was prepared according to the process of this invention.

In this short run, a solution of 3 mols of 2-amino-2-hydroxymethyl-1,3-propanediol in 4 mols of glacial acetic acid was heated at 100° C. until the theoretical amount of water had been removed. The product was then distilled, and a cut was obtained boiling at 150–158° C. at 5 mm. Hg absolute pressure. Upon cooling, crystals formed, and a 52 percent yield of 2-methyl-4,4-bis(hydroxymethyl) oxazoline was obtained after recrystallization from tetrahydrofuran. This material had a melting point of 88–90° C.

Reaction of an equivalent amount of this oxazoline compound with thiolbenzoic acid in pyridine gave 2-acetamido-2,2-bis(hydroxymethyl)ethyl thiolbenzoate, melting point 146–147° C., in 47 percent yield after recrystallization from ethanol. An elemental analysis of this compound gave the following results:

ELEMENTAL ANALYSIS

| Element | Weight Percent Calculated for $C_{13}H_{17}NO_4S$ | Weight Percent Found |
|---|---|---|
| Carbon | 55.10 | 55.7 |
| Hydrogen | 6.05 | 6.6 |
| Nitrogen | 4.94 | 4.1 |
| Sulfur | 11.32 | 11.1 |

Hydrolysis of the amide-thiolester in concentrated hydrochloric acid yielded 2-amino-2-mercaptomethyl-1,3-propanediol hydrochloride in 68 percent yield. This salt melted at 104–105° C. after recrystallization from isopropanol. An elemental analysis of this compound gave the following results:

ELEMENTAL ANALYSIS

| Element | Weight Percent Calculated for $C_4H_{12}ClNO_2S$ | Weight Percent Found |
|---|---|---|
| Carbon | 27.66 | 27.65 |
| Hydrogen | 6.97 | 6.94 |
| Nitrogen | 8.07 | 8.1 |
| Sulfur (mercaptan) | 18.46 | 17.8 |

*Example II*

In another run, 14.5 grams (0.1 mol) of 2-methyl-4,4-bis(hydroxymethyl)oxazoline, prepared by the method of Example I, and a solution of 13.8 grams (0.1 mol) of thiolbenzoic acid in 75 ml. acetonitrile were charged to a 500 ml. 3-necked flask equipped with a condenser, thermometer and stirrer. The solid oxazoline compound dissolved, and the temperature dropped to 15° C. The mixture was then heated on a steam bath to reflux (80° C.) for 5 minutes, after which the mixture was allowed to cool to room temperature and then allowed to stand overnight. Pink to red crystals formed which were filtered out and washed with water. The yield, after drying, was 16 grams of material melting 146–147° C. These crystals were identical to the amide-thiolester prepared in Example I. A second crop of crsytals was obtained by adding water to the filtrate and filtering out the additional solid which separated. An additional 1.5 grams of the crystalline materials was obtained.

*Example III*

A run was carried out in which 2-methyl-4-ethyl-4-hydroxymethyloxazoline was prepared, converted to 2-acetamido-2-hydroxymethyl-butylthiolbenzoate, and hydrolyzed to 2-amino-2-hydroxymethylbutanethiol hydrochloride according to the process of this invention.

The preparation of 2-methyl-4-ethyl-4-hydroxymethyl-oxazoline was carried out in the following manner. Three hundred grams (2.8 mols) of 2-amino-2-ethyl-1,3-propanediol, 800 ml. of xylene and 180 grams (3.0 mols) of acetic acid were charged to a 2-liter, 3-necked flask equipped with a stirrer, a Dean and Stark trap, thermometer, and condenser. The mixture was heated to reflux and maintained at reflux for 16 hours. The remaining material was then distilled in a Vigreaux column at atmospheric pressure under nitrogen, yielding 225 grams of a material boiling between 213–215° C., refractive index $N^{20}D$ 1.4638. Elemental analysis of this material gave the following results.

ELEMENTAL ANALYSIS

| Element | Weight Percent Calculated for $C_7H_{13}NO$ | Weight Percent Found |
|---|---|---|
| Carbon | 58.72 | 58.1 |
| Hydrogen | 9.15 | 9.7 |
| Nitrogen | 9.78 | 9.5 |
| Oxygen | 22.35 | (¹) |

¹ Not determined.

The above-prepared 2-methyl-4-ethyl-4-hydroxymethyl-oxazoline was converted to 2-acetamido-2-hydroxymethylbutylthiol benzoate in the following manner. Three hundred ml. acetonitrile, 107.5 grams (0.75 mol) of 2-methyl-4-ethyl-4-hydroxymethyloxazoline and 110 grams (0.75 mol) of 95 percent thiolbenzoic acid were charged to a flask and stirred under a $N_2$ atmosphere. The temperature immediately rose from 25° C. to 35° C. but was cooled back to 16° C. with an ice bath. The temperature was then maintained at 20–26° C. for four hours by intermittently applying an ice bath to the reaction mixture. The mixture was then heated to 50° C. and allowed to cool to 25° C. Five hundred ml. of water was added to the mixture, causing the formation of two phases. The organic phase was separated off and washed three times, using 500 ml. water in each wash. After the third wash, the organic material set up as a solid which was dissolved in 500 ml. of boiling benzene. This material was crystallized out of solution, washed with 200 ml. of 50/50 benzene/hexane and then washed with 200 ml. of hexane; after drying under vacuum, this thiol ester-amide was found to weigh 120.5 grams. One hundred grams of this material was separated for the following hydrolysis step, while the remaining 20.5 grams was recrystallized from benzene to yield 18 grams of material, melting point 93–95° C. An elemental analysis of this material gave the following results.

ELEMENTAL ANALYSIS OF 2-ACETAMIDO-2-HYDROXYMETHYLBUTYLTHIOLBENZOATE

| Element | Weight Percent Calculated for $C_{14}H_{19}NO_3S$ | Weight Percent Found |
| --- | --- | --- |
| Carbon | 59.76 | 59.9 |
| Hydrogen | 6.81 | 7.0 |
| Nitrogen | 4.98 | 4.8 |
| Oxygen | 17.06 | (1) |
| Sulfur | 11.40 | 11.22 |

[1] Not determined.

The above-prepared 2-acetamido-2-hydroxymethylbutylthiolbenzoate was converted to 2-amino-2-hydroxymethylbutanethiol hydrochloride in the following manner. One hundred grams (0.35 mol) of the above-prepared 2-acetamido-2-hydroxymethylbutylthiolbenzoate, 250 ml. of concentrated aqueous hydrochloric acid and 50 ml. water were heated to reflux overnight. The following morning, the mixture was allowed to cool and large amounts of crystals formed. The benzoic acid crystals were filtered off and washed with hydrochloric acid and water. The washings were added to the filtrate, and the liquid was stripped on a rotary evaporator to yield a water-white, thick oil. This oil was diluted with 100 ml. of isopropanol and again stripped on a rotary evaporator. Another 100 ml. of isopropanol was added, and crystallization occurred while stripping. This material was dried under vacuum, yielding 37.3 grams of material which was soluble in $H_2O$, isopropanol, methanol and ethanol and insoluble in tetrahydrofuran, acetonitrile, chloroform and acetone. This material was triturated with 100 ml. of tetrahydrofuran at reflux, allowed to cool, filtered and washed with 100 ml. tetrahydrofuran. After drying, 28.2 grams of material, melting point 101–102° C., was obtained. An elemental analysis of this material gave the following results.

ELEMENTAL ANALYSIS OF 2-AMINO-2-HYDROXYMETHYLBUTANETHIOL HYDROCHLORIDE

| Element | Weight Percent Calculated for $C_5H_{14}ClNOS$ | Weight Percent Found |
| --- | --- | --- |
| Carbon | 34.98 | 35.55 |
| Hydrogen | 8.22 | 8.2 |
| Chlorine | 20.65 | |
| Nitrogen | 8.16 | 7.8 |
| Oxygen | 9.32 | |
| Sulfur | 18.68 | |

I have discovered that the novel compounds produced according to the process described hereinabove including both the acid salt and free bases have the useful application of reducing the deadly effects of radiation. The compound 2-amino-2-mercaptomethyl-1,3-propanediol hydrochloride which was synthesized as described hereinabove was tested for antiradiation activity in mice. The results are as follows:

TABLE I

| Solution (percent) | pH | Dose (mg./kg.) * | Survival | |
| --- | --- | --- | --- | --- |
| | | | Number Mice | Percent |
| 5 | 5.7 | 1,000 | 15 | 94 |
| 5 | 5.7 | 500 | 15 | 53 |
| 5 | 5.7 | 250 | 15 | 0 |
| 5 | 5.7 | 0 | 10 | 0 |

*The dose of drug given the mice (by intraperitoneal injection) was calculated as free base and was given to the mice 30 minutes before exposure to 800 roentgens from a 300 kv. linear accelerator, delivered at 35 roentgens per minute and filtered through 2 mm. of copper and 0.25 mm. of aluminum. The dose is given in milligrams per kilogram of animal weight, mg./kg. After 30 days the percent survival of the irradiated mice was determined.

The results of the tests in which the drug was administered orally are described below in Table II. The material which was administered orally was either a 10 weight percent or 20 weight percent water solution, while the dose of the drug is calculated as free base. The time in minutes shown in the table is the time in which the drug was given to the mice prior to irradiation at the same rate described above for the injection tests.

TABLE II

| Time Elapsed Between Administering Drug and Radiation | Solution (Percent) | pH | Dose (mg./kg.)* | Survival | |
| --- | --- | --- | --- | --- | --- |
| | | | | Number Mice | Percent |
| 120 | 10 | 5.5 | 2,000 | 10 | 10 |
| 60 | 10 | 5.5 | 2,000 | 10 | 10 |
| 30 | 10 | 5.5 | 2,000 | 10 | 30 |
| | | | 0 | 10 | 0 |
| 30 | 20 | 4.8 | 2,000 | 14 | 42 |
| 15 | 20 | 4.8 | 2,000 | 15 | 6 |
| | | | 0 | 10 | 0 |

*The material which was administered was either a 10 weight percent or 20 weight percent water solution and was given to the mice prior to their exposure to 800 roentgens from a 300 kv. linear accelerator, delivered at 35 roentgens per minute and filtered through 2 mm. of copper and 0.2 mm. of aluminum.

These results conclusively show that the novel compounds synthesized according to the process described hereinabove have an effect in controlling the deadly effects of radiation upon animal life. It will be noted that when the compound was injected into the mice (Table I), the drug dose of 1000 mg./kg. resulted in a 94 percent survival of those mice so injected, while the mice being subjected to the same amount of radiation and having no such injection of our novel compound all died in less than 30 days. When the drug dose is dropped to 250 mg./kg. it will also be noted that none of the mice survived. When the drug was administered orally to the mice a dose of 2000 mg./kg. resulted in only a 10 percent survival of the mice, when this drug was administered 120 minutes prior to the radiation. When the drug was given to the mice 30 minutes prior to the radiation the percent survival increased to 30 percent. When the concentration of the water solution was increased to 20 percent and the drug was orally administered 30 minutes before the subjection of the mice to the radiation, it will be noted that 42 percent of the mice survived. There can be no questioning the fact that this drug does have an effect in reducing the lethal effects of radiation upon animal life.

Obviously many modifications and variations of the present invention are possible in light of the above teachings. It is therefore to be understood that within the scope

I claim:
1. A compound selected from those represented by the following general formula:

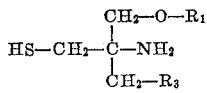

wherein $R_1$ represents a member selected from the group consisting of hydrogen and alkyl radicals containing from 1-12 carbon atoms and $R_3$ represents a member selected from the group consisting of hydroxyl radicals, alkoxy radicals having 1-12 carbon atoms, hydrogen and alkyl, aryl, and aralkyl radicals having 1-12 carbon atoms.

2. As a composition, 2-amino-2-mercaptomethyl-1,3-propanediol.

3. As a composition, 2-amino-2-hydroxymethylpropanethiol.

4. As a composition, 2-amino-2-hydroxymethylbutanethiol.

5. As a composition, 2-amino-2-hydroxymethylnonanethiol.

6. As a composition, 2-(ethoxyethyl)-3-ethoxy-2-aminopropanethiol.

7. A process for preparing compounds of the general formula:

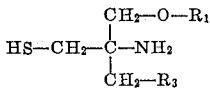

wherein $R_1$ represents a member selected from the group consisting of hydrogen and alkyl radicals containing from 1-12 carbon atoms and $R_3$ represents a member selected from the group consisting of hydroxyl radicals, alkoxy radicals having 1-12 carbon atoms, hydrogen and alkyl, aryl, and aralkyl radicals having 1-12 carbon atoms, comprising reacting a compound of the formula:

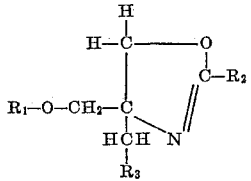

with a thiol acid of the formula:

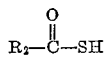

wherein $R_2$ is selected from the group consisting of alkyl, aryl, aralkyl and alkaryl radicals having from 1-12 carbon atoms, at an elevated temperature in a solution of one member selected from the group consisting of pyridine, acetonitrile, propionitrile, butyronitrile, pyrazine, pyrimidine, pyridazine, quinoline, and other alkyl-substituted pyridines, and hydrolyzing the thus obtained thiol esters with a strong mineral acid, being one selected from the group consisting of hydrochloric, sulfuric, and phosphoric.

8. A process for preparing 2-amino-2-mercaptomethyl-1,3-propanediol hydrochloride comprising the steps of reacting 2-methyl-4,4-bis(hydroxymethyl)-oxazoline with thiolbenzoic acid in pyridine solution and hydrolyzing the obtained ester with concentrated hydrochloric acid.

9. A process for preparing 2-amino-2-mercaptomethyl-1,3-propanediol hydrochloride consisting of the steps of contacting 2-methyl-4,4-bis(hydroxymethyl)-oxazoline with thiolbenzoic acid in acetonitrile solution and hydrolyzing the thiol ester thus obtained with concentrated hydrochloric acid.

References Cited

UNITED STATES PATENTS

| | | | |
|---|---|---|---|
| 3,075,878 | 1/1963 | Ziffer | 167—65 |
| 3,131,222 | 4/1964 | Omietanski | 260—584 |
| 3,155,584 | 11/1964 | Martin | 167—65 |
| 3,165,451 | 1/1965 | Louthan | 260—583 X |
| 3,189,653 | 6/1965 | Rudner et al. | 260—584 |

OTHER REFERENCES

Kalkwarf: Nucleonics, vol. 18, No. 5, pp. 76 to 81 and 130 to 131 (1960).

CHARLES B. PARKER, *Primary Examiner.*

REUBEN EPSTEIN, BENJAMIN R. PADGETT, *Examiners.*

L. A. SEBASTIAN, RICHARD L. RAYMOND, *Assistant Examiners.*